(12) United States Patent
Moshe et al.

(10) Patent No.: US 6,914,941 B1
(45) Date of Patent: Jul. 5, 2005

(54) METHOD AND SYSTEM FOR INCREASING BANDWIDTH CAPACITY UTILIZATION

(75) Inventors: Joseph Moshe, Herzlia (IL); Israel Vitelson, Givataim (IL)

(73) Assignee: ECI Telecom Ltd., Petach Tikva (IL)

( * ) Notice: Subject to any disclaimer, the term of this patent is extended or adjusted under 35 U.S.C. 154(b) by 666 days.

(21) Appl. No.: 09/704,530

(22) Filed: Nov. 3, 2000

(30) Foreign Application Priority Data

Nov. 3, 1999 (IL) ................................................ 132733

(51) Int. Cl.$^7$ ................................................ H04K 1/10
(52) U.S. Cl. ...................... 375/260; 370/536; 370/474; 375/240
(58) Field of Search ............................... 375/240, 372, 375/260, 354, 288, 224, 225, 28; 370/389, 535, 395, 536, 518, 476, 474, 468, 515, 522, 392, 415, 394; 714/712

(56) References Cited

U.S. PATENT DOCUMENTS

| | | | |
|---|---|---|---|
| 5,065,396 A | 11/1991 | Castellano et al. | |
| 5,231,649 A | * 7/1993 | Duncanson | ................. 375/260 |
| 5,251,210 A | 10/1993 | Mann et al. | |
| 5,923,667 A | * 7/1999 | Poiraud et al. | ............. 370/515 |

* cited by examiner

Primary Examiner—Shuwang Liu
Assistant Examiner—Ted Wang
(74) Attorney, Agent, or Firm—Browdy and Neimark, P.L.L.C.

(57) ABSTRACT

A method for increasing bandwidth utilization of a transmission channel having a first bandwidth capacity and operative at a first transmission rate, the method including the steps of providing one or more input bit streams each having a transmission rate that does not exceed that of the first transmission rate, dividing the one or more input bit streams into a plurality of sub-streams, each having a bandwidth lower than the first bandwidth capacity, selecting a group of sub-streams out of the plurality of sub-streams which group has a combined bandwidth just lower than the first bandwidth capacity, carrying the selected group of sub-streams over the transmission channel, and assembling the selected group of sub-streams into an output bit stream.

8 Claims, 2 Drawing Sheets

METHOD AND SYSTEM FOR INCREASING BANDWIDTH CAPACITY UTILIZATION

FIELD OF THE INVENTION

The present invention relates to digital network telecommunications systems and more particularly, to inverse multiplexing techniques for channel aggregation to enable better utilization of the bandwidth capacity available for signal transportation over a telecommunications network.

BACKGROUND OF THE INVENTION

The rapid development of the modern telecommunications carrier network has been driven by the ever-increasing demand for computer-based voice, video and data services, and as a result, there is an increased demand for larger bandwidth channels over extended distances, to handle the high-speed digital bandwidth applications. The existing telecommunications network contains carriers at specific rates that may not match the needed bandwidth of the user. These carriers were originally designed to handle voice calls which have been digitized at a 64 Kbs rate, and contain a hierarchy of multiplexing so as to carry multiple voice calls on a single carrier.

In the International Telecommunications Union (ITU) G.704 system used in Europe, there exists a first level multiplex rate of 2.048 Mbps, commonly referred to as an E-1 signal, which can carry 32 channels of 64 Kbs each, which typically represent 30–31 voice channels and one control channel. However, the E-1 signal can also be used to carry a "clear" signal of 2.048 Mbps, which is not divided into 32 channels. Higher level multiplexing is done in stages, with an E-2 signal containing 4 multiplexed E-1 signals at a bit rate of 8.448 Mbps, and an E-3 signal containing 4 multiplexed E-2 signals at a bit rate of 34.368 Mbps. At each stage of multiplexing, a certain amount of overhead is required, and therefore the bit rate is slightly higher than the sum of the individual multiplexed signals.

In North America, the ANSI standard T1.107 has an equivalent multiplexing hierarchy, with a T-1 or DS-1 signal representing 24 multiplexed voice channels at a 1.544 Mbps bit rate, a DS-2 signal containing 4 DS-1 signals at a 6.312 Mbps bit rate, and a DS-3 signal containing 7 DS-2 signals at a 44.736 Mbps bit rate. The higher order signals may also be used to carry "clear" signals which do not consist of multiplexed channels, but are instead utilized as simple data carriers at the above mentioned bit rates.

It is often necessary to carry data rate signals originating in one system, e.g. the ITU system, by a North American carrier signal. Thus, a clear E-3 signal, containing a data rate 34.368 Mbps may be carried on a DS-3 carrier which has a bit rate of 44.736 Mbps.

In addition to the above signals, two synchronous systems originally designed for optical transmission exist, namely SONET (Synchronous Optical Network) utilized primarily in North America, and SDH (Synchronous Digital Hierarchy). Both of these standards are designed to handle clear signals at their originating rate for ultimate transport over the network. Thus, an SDH network operating at 622.08 Mbps signals, may carry a large number of 2.048 Mbps signals originating as E-1 signals, and may also carry E-3 and DS-3 signals. This is done in virtual containers, as described in ITU-T recommendation G.707 for SDH systems and in ANSI standard T1.105 for SONET systems.

As mentioned above, however, these carriers exist at a specific data rate, which may not match the bandwidth required by the user. This problem is addressed by the inverse multiplexing technique which enables low bandwidth communications channels to be combined into a single, high bandwidth communication channel.

An example of a system addressing the mismatch of existing telecommunication network bandwidths with the high data rate applications exceeding the available bandwidths, is disclosed in U.S. Pat. No. 5,065,396 to Castellano. An inverse multiplexing technique is disclosed for use in demultiplexing a high data rate input signal into lower rate subsectional or sub-stream output signals, which are then transmitted over existing lower rate transmission facilities. At the receiving end, the lower rate sub-stream signals are recovered and provided as inputs to a resynchronizing means, for producing the original signal and transmitting it to an end user device.

In U.S. Pat. No. 5,251,216 to Mann et al, there is disclosed a method of transforming multiple low bandwidth telecommunication channels into a single high bandwidth telecommunication channel. This is achieved by disassembly of a large datastream on a high bandwidth channel into multiple datastreams for transmission on low bandwidth channels, and the re-assembly of the individual datastreams on the low bandwidth channels into a single aggregate datastream on a high bandwidth channel. The disassembly occurs with the transmission of data, and the re-assembly occurs on receiving the data.

The Mann patent refers to a problem relating to the standard channels which have a bandwidth which does not match the required data rate bandwidth. Available North American channel capacity, such as in the case of a common T1 signal is 1.544 Mbps, whereas the next commonly available bandwidth step in the hierarchy is a T3 signal having a data rate of 44.736 Mbps. When an intermediate capacity is required, the typical solution is to use several individual T1 signals or use an entire T3 signal in which only a portion of the available bandwidth capacity is used, thus wasting available bandwidth capacity.

In cases, where a "clear" E-3 signal is used, there are no individual E-1 signals to be recovered. The entire "clear" E-3 signal may be transferred within the DS3 signal, but since the E-3 signal has a 34.368 Mbps and the DS3 signal has a bandwidth of 44.736 Mbps, the extra bandwidth capacity is wasted.

Prior art solutions attempt to meet the mismatch between available carriers, and the desired data bandwidth channels by using the inverse multiplexing technique to aggregate low bandwidth channels to provide a larger bandwidth. This is clearly not economical in the above example, where 23 DS-1 signals would be needed, each at a rate of 1.544 Mbps to carry the clear E-3 signal. Thus a method to efficiently utilize the bandwidth when carrying a clear data signal in a higher speed channel is needed.

SUMMARY OF THE INVENTION

Accordingly, it is a principal object of the present invention to overcome the disadvantages associated with prior art solutions to utilizing channel bandwidth capacity, and provide a method and system for increasing bandwidth capacity utilization.

In accordance with a preferred method of the present invention, there is provided a method of increasing bandwidth utilization of a transmission channel having a first bandwidth capacity and operative at a first transmission rate comprising the steps of:

providing one or more input bit streams each having a transmission rate that does not exceed that of said first transmission rate;

dividing said one or more input bit streams into a plurality of sub-streams, each having a bandwidth lower than said first bandwidth capacity;

selecting a group of sub-streams out of said plurality of sub-streams, which group has a combined bandwidth just lower than said first bandwidth capacity;

carrying said selected group of sub-streams over said transmission channel; and assembling said selected group of sub-streams into an output bit stream.

An inverse multiplexing technique, as known in the prior art, concerns methods for taking high speed data rates and converting them to data rates suitable for carrying over slower rate transmission channels. In accordance with an embodiment of the present invention, the inverse multiplexing technique is applied in a different way, and as used herein is applied to a plurality of input data streams, at least one of which may be a "clear" signal, which is not normally demultiplexed and broken up into a number of sub-streams. Typically, as stated in the Background, an entire "clear" signal consisting of a single physical channel is carried by a transmission channel having an available bandwidth capacity, even if bandwidth capacity is wasted.

By contrast, in the present invention, a first plurality of "clear" signals is demultiplexed so that a second plurality of lower bandwidth sub-stream signals is developed, and a determination is made regarding the group of low bandwidth sub-stream signals that can be combined and carried by the available transmission channel, utilizing the maximum bandwidth capacity, without wasting capacity.

It will be appreciated by those skilled in the art that the overall bandwidth of all bit streams may or may not exceed that of the first bandwidth capacity. By appropriate division of input bit streams into a plurality of sub-streams and selection of a group of sub-streams for transmission within the first bandwidth capacity, a desired output bit stream may be assembled.

According to one preferred method of the present invention, a "clear" E3 signal of 34.368 Mbps is carried by a DS3 transmission channel, which is a 44.736 Mbps carrier. While in the normal situation, a wastage of bandwidth capacity occurs when one such signal is carried by such a carrier, in the present invention, the E3 signal is demultiplexed by using the inverse multiplexing technique, and the E3 signal is broken up into 18 parallel E1 signals, each of which is transmitted separately over its own serial path within the transmission channel. Another "clear" E3 signal is similarly demultiplexed, and three of the resulting set of 18 E1 signals are taken and combined with the first set of 18 E1 sub-stream signals, so that 21 sub-stream E1 signals are carried by the DS3 transmission channel.

In this fashion, the full bandwidth capacity of the DS3 transmission channel is utilized, since 21 E1 signals each requiring 2.048 Mbps, including the overhead layer, can be carried within the 44.736 Mbps DS3 carrier. Thus, by taking 3 E1 signals from each of the groups of 18 E1 signals produced by inverse multiplexing of a "clear" E3 signal, a plurality of sets of 21 E1 signals is developed, and these sets are carried by the DS3 carrier with minimum wastage of bandwidth capacity.

For the case of seven "clear" E3 signals, while the typical prior approach would have required seven DS3 transmission channels, one signal in each channel, by use of the inventive method and combination of the lower bandwidth sub-stream signals as above, it can be shown that only six DS3 transmission channels are required.

In an alternative method of the invention, the individual low bandwidth sub-stream signals can be combined and carried as a payload by a virtual container in a VC3 format, relating to the SONET or SDH signal transmission network hierarchy.

As previously explained, the method provided by present invention can also be implemented in an SDH type of network. In such a network, an STM1 signal typically carries either three DS3 type of signals or alternatively, three E3 type of signals. In accordance with the present invention, the STM1 signal may carry the capacity of nine additional E1 signals as each of the DS3 signals will carry 21 $\mu$l signals instead of 18 E1 signals as known in the art, which adds up to an additional capacity of nine E1 signals for three DS3 signals carried within the STM1 signal.

Although the present invention is described in particularly with reference to E3 and DS3 type of signals, it should be understood to encompass any other type of transmissions as may be applicable, e.g. E2 type of signals, DS2 type of signals, video signals and the like.

Other features and advantages of the invention will become apparent from the drawings and the description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
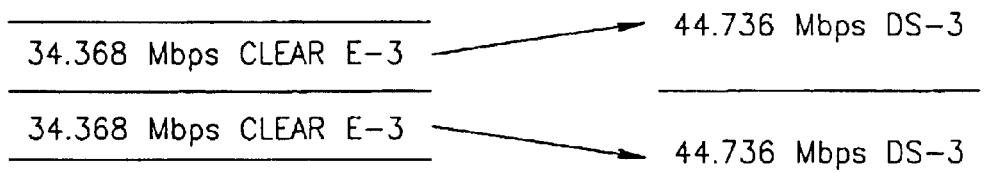
FIG. 1 is a schematic illustration of a prior art method for transporting a telecommunications signal via a telecommunication carrier, where the signal and carrier bandwidths do not match.

Referring now to FIG. 1, there is shown a schematic illustration of a prior art method for transporting a telecommunications signal, such as a "clear" E-3 signal via a telecommunications carrier, such as a DS3 carrier, where the signal and carrier bandwidths do not match. The "clear" E3 signal has a 34.368 Mbps data rate, and one such signal can easily be carried by a DS3 carrier, which has a 44.736 Mbps bandwidth. As stated in the Background with regard to the Mann patent, a problem with transportation of standard "clear" transmission channels having a bandwidth which does not match the available channel capacity, is that by transporting these signals over existing channels, a situation develops wherein a single physical channel has only a portion of the available bandwidth capacity used. Thus, it is seen that a "clear" channel may have valuable bandwidth capacity wasted.

In FIG. 1, the "clear" E3 signal is carried by a DS3 carrier, but the use of one DS3 carrier for one "clear" E3 signal results in an unused bandwidth represented by the difference in bit rates, i.e., approximately 10.368 Mbps. This capacity would be wasted by applying prior art techniques to transport the "clear" E3 signal via a DS3 carrier.

Figure 2:
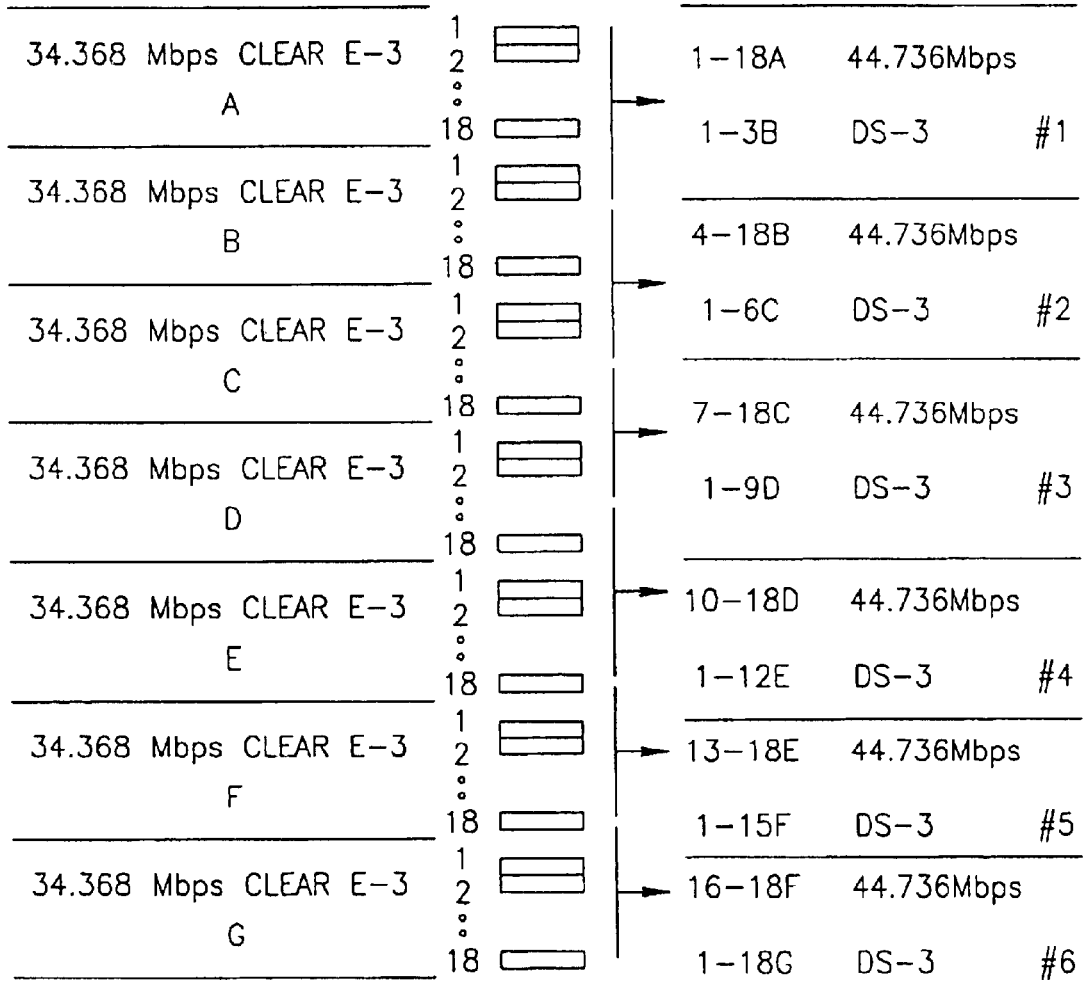
FIG. 2 is a schematic illustration of a method for transporting a group of telecommunications signals via a group of telecommunications carriers having non-matching bandwidths, in accordance with the principles of the present invention.

Referring now to FIG. 2, there is shown a schematic illustration of a method for transporting a group of seven "clear" E3 telecommunications signals, labeled A–G, via a group of DS3 telecommunications carriers, labeled nos. 1–6, whose bandwidths are equal to each other but not to the E3 signals, in accordance with the principles of the present invention. As will be described further herein, each of the "clear" E3 signals is split up into 18 parallel E1 signals, using the inverse multiplexing technique. By maintaining careful track of the process of inverse multiplexing, using the necessary overhead layers, each of the individual E1 signals can be grouped together with other signals and a group of 21 E1 signals can be carried over the DS3 carrier, and at the receiving end of the communications network, the individual E1 signals can be re-assembled, to again establish the "clear" E3 signal, keeping the bit rate and the bit integrity. In this fashion, the DS3 carrier is utilized to its full capacity by more tightly packing the carrier channel with the E1 signals.

With reference to the illustration of FIG. 2, each of the seven "clear" E3 signals has been inverse multiplexed into 18 E1 signals, labeled 1-18A, 1-18B . . . 1-18G, each set being associated with an original E3 signal. For identification purposes, each of the E1 signals has been identified with a particular one of the six DS3 carriers. For example, DS3 carrier No. 1 has associated therewith the group of E1 signals labeled 1-18A and 1-3 B, for a total of 21 E1 sub-stream signals, which can be carried by the DS3 carrier. DS3#2 carries the balance of E3-B, namely sub-stream signals 4–18 B, as well as sub-stream signals 1–6 C of the third E3 signal. Thus for each DS3 carrier, a full E3 signal is carried together with 3/18 or 1/6 of the next E3 signal as shown in e.g., FIG. 2. #1. A total of six DS3 carriers is thus used to carry seven E3 signals. This is to be contrasted with the prior art technique, which would require seven DS3 carriers, each underutilized, for seven E3 signals.

Thus, the present invention achieves the saving of carrier channels by utilizing the IMUX (inverse multiplexing) technique first to break apart the clear high speed signal into slower speed signals, and then packing those signals onto a high speed carrier.

Figure 3:
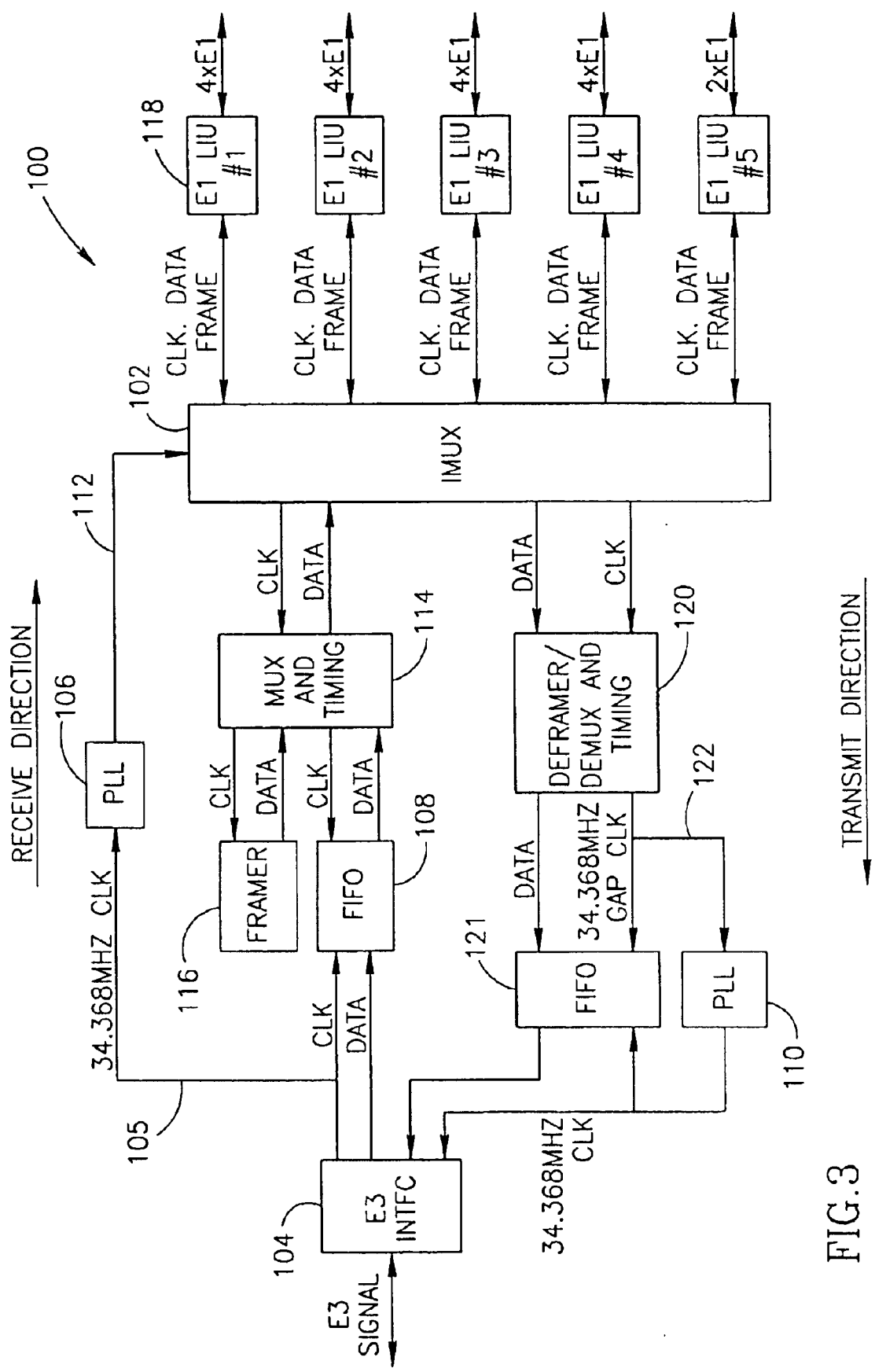
FIG. 3 is an electronic schematic block diagram of a system for increasing bandwidth capacity utilization, constructed and operated in accordance with a preferred embodiment of the invention.

The following discussion provides a review in detail the operation of the IMUX technique as utilized in FIG. 2 and in FIG. 3. Each of the E1 sub-stream signals can be viewed as a data stream having 32 channels of 8 bits each, or as a clear data signal of 2.048 Mbps which consists of 256 bits per frame, with a frame rate of 8000/sec or 125 microseconds per frame. In order to perform the IMUX (inverse multiplexing) procedure, some bits are necessary for the overhead, e.g. for a control channel, to keep close track of the order of the sub-stream signals. In accordance with the present invention, 9 bits per frame are utilized. The remaining 247 bits/frame are available for data transfer, thus representing an effective rate of 1.976 Mbps. The effective data rate of 18 E1 signals is therefore 18×E1=35.568 Mbps, while the actual bit rate of the 18 sub-stream signals is 18×2.048=36.864 Mbps, with the difference for overhead.

As explained in the Background above, a clear E-3 signal does not contain individual E-1 signals, and therefore the IMUX technique must utilize some bandwidth as its overhead to reconstruct the clear E-3 signal.

Referring now to FIG. 3, there is shown an electronic schematic block diagram of a system for increasing bandwidth capacity utilization, constructed and operated in accordance with a preferred embodiment of the invention. The system 100 is constructed with an inverse multiplexer 102, and the block diagram can be viewed in one of two directions, either in the receive direction (see arrow) in which a signal is received at interface 104 for demultiplexing, or in the transmit direction, in which the demultiplexed signals are sent and received for re-assembly into the original signal.

In the receive direction, the E3 signal is received at interface 104, and the clock signal 105 is recovered from the frame format and fed to the phase-locked loop PLL 106 and the FIFO register 108. The PLL 106 in the receive direction, and the PLL 110 in the transmit direction, are used for keeping the E3 bit rate constant throughout the transmission path, by locking in the recovered clock signal. The PLL 106 is operative to adapt the rate of clock signal 112 being fed to the IMUX 102 to that of clock signal 105.

The E3 signal has a data rate of 34.368 Mbps, but the effective data rate of the E1 signals to be used in an IMUX to carry the portions of the E3 signal are multiples of 1.976 Mbps. Thus, there is an effective data rate for the 18 E1 signals of 35.568 Mbps. The difference is handled by using a bit stuffing technique, wherein meaningless bits are stuffed for framing purposes. Frames are built with the bit stuffing used to fill the frame markers. With a standard frame rate of 8000 per second, a total of 150 bits per frame may be stuffed, which is accomplished by framer 116.

The serial data is fed out of the FIFO register 108 to a multiplexer and timing block (MUX) 114, and simultaneously the framer block 116 passes framing bits as required by the MUX timer 114. The IMUX 102 receives the data as well as the PLL 106 clock signal 112, and the data is clocked out from the MUX 114 into the IMUX 102 at the IMUX data rate of 35.568 Mbps, and this splits up the signal into 18 individual E1 signals, each with the necessary overhead information as explained above. The E1 signals each have a line interface unit 118 (LIU) which drives a standard E1 line. The 18 E1 signals can be combined with three more E-1 signals from another system 100 and carried by a DS3 carrier, or inserted into a VC3 tributary of an SDH or SONET system.

In the transmit direction, the 18 E1 signals are received by the line interface units 118 (LIU), and they are fed to the IMUX 102 which removes the overhead channel and strips out the framing, and the resultant data is clocked into the deframe/demux and timing block 120. The stuffed bits are removed and the signal is deframed, and is then sent to the FIFO register 121, where it is clocked in using a 34.368 Mhz clock with predetermined gaps, per the gap clock signal 122. This means that the clock rate is based on a higher speed clock, i.e. 35.568 Mhz, however certain clock pulses are removed, according to the predetermined gaps provided by gap clock signal 122, to avoid the clock pulses which would clock in the stuffed bits. The PLL is used to get an average clock of 34.368 Mhz, which is the actual clock rate of the gap clock signal 122.

The data signal at 34.368 Mbps is clocked out of the FIFO register 121 at the average clock rate of 34.368 Mhz, and the recovered E3 signal is provided to interface 104, with the identical format of the original E3 signal and with the same bit rate.

It will be appreciated by those skilled in the art that the inventive technique of maximizing bandwidth capacity utilization is also applicable to other combinations of signals. The principles of splitting an incoming data signal into component signals which can be repackaged more tightly for transportation in an existing carrier, can also be applied to carrying an E3 signal with DS1 signals as the subsidiary carrier. In addition, the subsidiary carriers can be used to fill the bandwidth of a VC3 or a DS3 within AU3 or AU4 of an SDH/SONET system.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

What is claimed is:

1. A method of increasing bandwidth utilization of a transmission channel having a first bandwidth capacity and operative at a first transmission rate comprising the steps of:
   providing at least two input bit streams each having a transmission rate less than that of said first transmission rate wherein at least one of said at least two input bit streams has a plurality of overhead bits associated therewith;
   dividing said at least two input bit streams into a plurality of sub-streams, each having bandwidth lower than said first bandwidth capacity, wherein the difference between the first bandwidth capacity and a bandwidth capacity of each of the at least two input bit streams is at least equal to the bandwidth of one of the plurality of sub-streams;
   selecting a group of sub-streams out of said plurality of sub-streams, which group has a combined bandwidth just lower than said first bandwidth capacity; and wherein said group comprises at least one sub-stream which comprises at least some of said plurality of overhead bits;
   carrying said selected group of sub-streams over said transmission channel; and
   assembling said selected group of sub-streams into an output bit stream.

2. The method of claim 1 wherein said dividing step is performed using an inverse: multiplexing technique producing said plurality of subs-streams and overhead bits.

3. The method of claim 1 wherein said selecting step is performed by determining said group of sub-streams such as to minimize wasted bandwidth of said first bandwidth capacity.

4. The method of claim 1 wherein said first bandwidth capacity is associated with a DS3 transmission channel, and wherein said input bit streams comprise a plurality of E3 signals, such that in said dividing step, said plurality of E3 signals are each divided into 18 parallel E1 sub-stream signals, and in said selecting step, a group of 21 of said parallel E1 sub-stream signals is selected for transmission over said DS3 transmission channel.

5. The method of claim 4 wherein seven E3 signals are carried in six DS3 transmission channels.

6. The method of claim 4 for use in an SDH type of network, wherein an STM1 signal carries three DS3 signals each comprising said selected group of 21 of said parallel E1 sub-stream signals, such that said STM1 signal carries an additional 9 E1 signals for each three DS3 signals carried therein.

7. A system for increasing bandwidth utilization of a transmission channel having a first bandwidth capacity and operative at a first transmission rate, said system comprising:
   means for providing at least two input bit streams having each having a transmission rate less than that of said first transmission rate wherein at least one of said at least two input bit streams has a plurality of overhead bits associated therewith;
   means for dividing said at least two input bit streams into a plurality of sub-streams, each having a bandwidth lower than said first bandwidth capacity, wherein the difference between the first bandwidth capacity and a bandwidth capacity of each of the at least two input bit streams is at least equal to the bandwidth of one of the plurality of sub-streams;
   means for selecting a group of sub-streams out of said plurality of sub-streams, which group has a combined bandwidth just lower than said first bandwidth capacity and wherein said group comprises at least one sub-stream which comprises at least some of said plurality of overhead bits; and
   means for assembling said selected group of sub-streams into an output bit stream after said selected group of sub-streams is carried over said transmission channel.

8. The system of claim 7 wherein said means for dividing said input bit streams into a plurality of sub-streams comprises an inverse multiplexer.

* * * * *